(12) United States Patent
Kusama et al.

(10) Patent No.: US 11,328,631 B2
(45) Date of Patent: May 10, 2022

(54) INTERIOR-LIGHT-UTILIZING DISPLAY

(71) Applicant: LINTEC Corporation, Tokyo (JP)

(72) Inventors: Kentaro Kusama, Tokyo (JP); Tatsuki Kuramoto, Tokyo (JP)

(73) Assignee: LINTEC Corporation, Tokyo (JP)

( * ) Notice: Subject to any disclaimer, the term of this patent is extended or adjusted under 35 U.S.C. 154(b) by 277 days.

(21) Appl. No.: 16/244,424

(22) Filed: Jan. 10, 2019

(65) Prior Publication Data

US 2019/0259312 A1 Aug. 22, 2019

(30) Foreign Application Priority Data

Feb. 22, 2018 (JP) .............................. JP2018-030015

(51) Int. Cl.
| | |
|---|---|
| *G02B 5/02* | (2006.01) |
| *G09F 13/16* | (2006.01) |
| *G02B 5/00* | (2006.01) |
| *G02B 5/122* | (2006.01) |
| *G09F 21/04* | (2006.01) |
| *G02B 1/14* | (2015.01) |

(52) U.S. Cl.
CPC ............. *G09F 13/16* (2013.01); *G02B 5/003* (2013.01); *G02B 5/0215* (2013.01); *G02B 5/0284* (2013.01); *G02B 5/122* (2013.01); *G09F 21/04* (2013.01); *G02B 1/14* (2015.01)

(58) Field of Classification Search
CPC ........ G02B 5/003; G02B 5/02; G02B 5/0205; G02B 5/0236; G02B 5/0242; G02B 5/0247; G02B 5/0284; G02B 5/0289; G09F 13/16; G09F 21/04
USPC .................................................. 359/599, 601
See application file for complete search history.

(56) References Cited

U.S. PATENT DOCUMENTS

| | | | | |
|---|---|---|---|---|
| 7,679,823 | B2 * | 3/2010 | Etori ...................... | G03B 21/60 |
| | | | | 359/449 |
| 9,616,823 | B1 * | 4/2017 | Salter ....................... | B60Q 1/26 |
| 10,185,063 | B2 * | 1/2019 | Kusama ............... | G02B 5/0242 |
| 2015/0168613 | A1 * | 6/2015 | Hong .................. | G02B 26/0833 |
| | | | | 345/501 |
| 2016/0018571 | A1 * | 1/2016 | Kusama ............... | C08F 283/006 |
| | | | | 428/220 |
| 2016/0047952 | A1 * | 2/2016 | Kusama ............... | C08F 283/006 |
| | | | | 252/582 |
| 2016/0327697 | A1 * | 11/2016 | Sugiyama ............ | G02B 5/0236 |

* cited by examiner

*Primary Examiner* — Thong Q Nguyen
(74) *Attorney, Agent, or Firm* — Renner, Kenner; Arthur M. Reginelli

(57) ABSTRACT

In various embodiments, the present invention is directed to an interior-light-utilizing display obtained by laminating a reflection structure and a light diffusion film, in which the light diffusion film has an internal structure including a plurality of regions having a relatively high refractive index in a region having a relatively low refractive index in the film. The interior-light-utilizing display provides improved luminance and is capable of stably maintaining constant display characteristics even where the incident angle of the external light changes.

12 Claims, 16 Drawing Sheets

(Prior Art)

INTERIOR-LIGHT-UTILIZING DISPLAY

BACKGROUND OF THE INVENTION

1. Field of the Invention

The present invention relates to an interior-light-utilizing display (hereinafter optionally referred to an interior-light-utilizing type display body) which obtains predetermined diffused and reflected light by utilizing an interior light of a train, a bus, and the like at least during the night and by which a viewer in a vehicle such as a train as well as a viewer outside a train or the like could clearly recognize a station name signboard or the like.

2. Description of the Related Art

Hitherto, an external-light-utilizing display, which is obtained by printing a character or an image on a plane having light diffusion characteristics or a specular reflection plane or by pasting a transparent or semi-transparent film having a character or an image printed thereon to those planes, has been utilized as a signboard or a sign.

Such an external-light-utilizing display is characterized by utilizing, as a light source, external light such as various lightings, direct solar radiation, diffused skylight, or two-dimensionally scattered light from buildings, road surfaces, trees, and the like, and causing a desired display light to be scattered and emitted.

Further, as such an external-light-utilizing display, a display body, which is obtained by laminating a light diffusion film obtained by dispersing fine particles in a resin on a front surface of a decorative layer having a desired pattern or the like printed thereon, has been proposed (for example, JP 2001-109414 A (Claims)).

More specifically, as illustrated in FIG. 15A, a front surface plate 301 for a signboard, which has unevenness formed at least on one surface and includes a light transmissive plate having a total luminous transmittance of 90% or more and a haze of 20% or less, and a signboard using the same have been proposed.

That is, a center line average roughness of the uneven surface is 0.2 to 0.7 µm, a 10-point average roughness thereof is 1 to 7 µm, and the light transmissive plate is configured by a transparent substrate 302 and a light diffusion layer 303 laminated to one surface or both surfaces of the transparent substrate 302 to be integrally formed.

Further, a signboard has been disclosed in which the light diffusion layer 303 is a type in which resin particles are dispersed in a synthetic resin and a display body 320 is disposed on the front surface plate 301 for a signboard on which the uneven surface is formed on the surface thereof and at the rear surface side of the front surface plate 301 for a signboard.

Furthermore, a retroreflective external-light-utilizing display obtained by laminating a decorative layer having a desired pattern or the like printed thereon on a front surface of a retroreflective surface using a prism, a corner cube array, microbeads, or the like has been proposed (for example, JP 2003-531396 W (Claims)).

More specifically, as illustrated in FIG. 15B, a retroreflective cube corner sheeting 424 has been proposed.

That is, the retroreflective cube corner sheeting includes a cube layer 432 which includes a viewing surface, a structured surface 435 provided with a plurality of cube corner elements bounded by at least two intersecting sets of parallel grooves, and a metallic film 430 disposed on at least some of the cube corner elements.

Further, disclosed is the retroreflective cube corner sheeting 424 which includes a substantially transparent overlay layer 434 having a front surface and a rear surface coupled to the viewing surface of the cube layer 432 and pigmented indicia 416 disposed on the overlay layer 434 and in which the pigmented indicia 416 are aligned with at least one of sets of grooves.

However, in the case of a signboard using the front surface plate for a signboard described in JP 2001-109414 A (Claims), a problem arises in that constant display characteristics are difficult to stably maintain in a case where an incident angle of external light changes.

Further, in the case of the retroreflective cube corner sheeting described in JP 2003-531396 A (Claims), since light is retro-reflected in the incident angle direction and thus the display characteristics are exhibited only in an angle range relatively close to the front face, a problem arises in that the retroreflective cube corner sheeting may not be used in practice for use application in which the incident angle of external light changes.

That is, in both the front surface plate for a signboard described in JP 2001-109414 A (Claims) and the retroreflective cube corner sheeting described in JP 2003-531396 A (Claims), it is not supposed at all that predetermined diffused and reflected light is obtained utilizing an interior light of a train, a bus, and the like during the night, and accordingly, a station name display function or the like is exhibited with respect to a viewer.

SUMMARY OF THE INVENTION

In this regard, the present inventors have intensive studies in view of the circumstances as described above and found that those problems could be solved by an interior-light-utilizing display obtained by laminating a reflection structure (reflection layer) and a predetermined light diffusion film, thereby completing the invention.

That is, the display could be recognized by predetermined diffused and reflected light utilizing external light (such as sunlight) during daylight; meanwhile, predetermined diffused and reflected light could be obtained utilizing a large number of interior lights of trains, buses, and the like during the night. Accordingly, the invention aims to provide an interior-light-utilizing display which could be recognized as a station name signboard or the like by a viewer or the like in a vehicle.

According to the invention, there is provided an interior-light-utilizing display being obtained by laminating a reflection structure and a light diffusion film, in which the light diffusion film has an internal structure including a plurality of regions having a relatively high refractive index in a region having a relatively low refractive index in the film, and when a normal line direction in the plane of the light diffusion film is regarded as 0°, an angle of aperture (angle width of diffusion angle) of emitted light having a gain in a horizontal direction of 1 or more is set to a value of 35° or more, the angle of aperture of emitted light being measured in a case where a light beam with an incident angle of 0° is irradiated in the horizontal direction from a side opposite to a side facing the reflection structure of the light diffusion film to the interior-light-utilizing display disposed in a vertical direction, whereby the aforementioned problems could be solved.

That is, according to the interior-light-utilizing display of the invention, since the light diffusion film having a predetermined internal structure is used, the interior-light-utilizing display is installed in the vertical direction, and at least during the light, in a case where light of the interior light incident from a wide range of angle is received, the light could be efficiently diffused and reflected at a wide range of angle of aperture.

Therefore, since the diffused and reflected light having a predetermined illuminance is emitted from the interior-light-utilizing display at a predetermined angle of aperture, even a plurality of viewers and the like existing in a vehicle could clearly recognize the interior-light-utilizing display as a station name signboard or the like without a particular electric power.

Incidentally, the gain refers to a numerical value representing reflection characteristics in screen fields. The gain is an index indicating a degree of light diffusion that means a proportion of a luminance value obtained by measuring reflected light emitted from a certain light source to a complete diffusion plate (standard white plate) with a luminance meter and irradiating a screen with the light at each angle under the same condition using the luminance value as a reference value (1) (or criteria value).

Therefore, this means that, as the numerical value of the gain increases, the degree of light diffusion could be increased, and further, a plurality of viewers and the like in a vehicle could simultaneously and clearly recognize the interior-light-utilizing display as a station name signboard or the like.

Further, on the occasion of configuring the interior-light-utilizing display of the invention, it is preferable that, when a normal line direction in the plane of the light diffusion film is regarded as 0°, an angle of aperture (angle width of diffusion angle) of emitted light having a gain in a horizontal direction of 1 or more is set to at least a value of 20° or more, the angle of aperture of emitted light being measured in a case where light beams with incident angles of 20° and −20° are irradiated in the horizontal direction from a side opposite to a side facing the reflection structure of the light diffusion film to the interior-light-utilizing display disposed in a vertical direction.

When the interior-light-utilizing display is configured as such, even in a case where the incident angle of light from the interior light changes with respect to the interior-light-utilizing display, since a train or a bus is usually horizontally long, there is an advantage that light with a predetermined angle range is further easily secured.

For example, even when light from one window is out of a predetermined angle to the interior-light-utilizing display with the movement of a vehicle, the light from another window is newly incident within a predetermined angle range.

Therefore, as a matter of practice, since the interior-light-utilizing display has a large light diffusion incident angle region, even in a case where a vehicle moves, a constant amount of light could be received.

Moreover, by the light-converging effect, light beams of interior lights from a plurality of windows are incorporated, and the reflection luminance of the interior-light-utilizing display could be increased.

For this reason, a plurality of viewers and the like in a vehicle as well as a viewer outside the vehicle could simultaneously and clearly recognize the interior-light-utilizing display as a station name signboard from another window.

Further, on the occasion of configuring the interior-light-utilizing display of the invention, it is preferable that the internal structure in the light diffusion film is a columnar structure in which a plurality of pillar-shaped objects having a relatively high refractive index are arranged to stand close together in a film thickness direction in a region having a relatively low refractive index.

When the interior-light-utilizing display is configured as such, since further favorable light scattering property (isotropic diffusion) is obtainable, light from the interior light at a wide range of incident angle could be utilized, and further, the emission luminance to be visually recognized could also be effectively increased.

Further, on the occasion of configuring the interior-light-utilizing display of the invention, it is preferable that the columnar structure is a multiple columnar structure obtained by laminating at least a first columnar structure and a second columnar structure in the film thickness direction.

When the interior-light-utilizing display is configured as such, although the film thickness is slightly increased, even light from the interior light at a wider range of incident angle could be effectively utilized, and further, the emission luminance of the diffused and reflected light to be visually recognized by a viewer or the like in a vehicle could be further increased.

Further, on the occasion of configuring the interior-light-utilizing display of the invention, it is preferable that the columnar structure has a bent part in the middle of the pillar-shaped object.

When the interior-light-utilizing display is configured by providing a predetermined bent part as such, light from the interior light at a wider range of incident angle could be utilized, and further, the emission luminance of the diffused and reflected light to be visually recognized by a viewer or the like in a vehicle could be further increased.

Further, on the occasion of configuring the interior-light-utilizing display of the invention, it is preferable that a decorative layer is provided between the reflection structure and the light diffusion film or a side opposite to a side at which the reflection structure is positioned in the light diffusion film.

When the interior-light-utilizing display is configured by including the decorative layer as such, even in a case where the incident angle of light from the interior light changes, by the effect of a predetermined light diffusion film, desired display contents by the decorative layer could be stably displayed with constant display characteristics.

Furthermore, by the decorative layer, a viewer or the like in a vehicle could recognize the interior-light-utilizing display as display light representing a station name display or the like with excellent luminance uniformity.

Further, on the occasion of configuring the interior-light-utilizing display of the invention, it is preferable that an ultraviolet absorption layer is provided at a front surface of the light diffusion film.

When the interior-light-utilizing display is configured as such, a degradation of the light diffusion film due to ultraviolet rays could be effectively prevented and the interior-light-utilizing display could be withstood against use for a long period of time.

Further, on the occasion of configuring the interior-light-utilizing display of the invention, it is preferable that a train or a bus is utilized as a light source of the interior-light-utilizing display.

When the interior-light-utilizing display is configured as such, it is characterized that the incident angle of light from the interior light is considered to change with the movement of a train or the like, but since a train or the like is usually horizontally long, the light beams of interior lights are respectively emitted from a plurality of windows.

As a result, even in the case of a moving train or the like, a viewer or the like in a vehicle could clearly and uniformly recognize display light representing a station name display or the like.

Moreover, in the case of a moving train or the like, since incident light in a predetermined angle and incident light out of the predetermined angle are comparable, it can be said that the brightness of the interior-light-utilizing display is maintained at a constant level.

Furthermore, in the case of a moving train or the like, since the angle of aperture of the interior-light-utilizing display is large, a viewer or the like in a vehicle could visually recognize station name display or the like at a certain movement distance, that is, for a certain time period with the same level of sharpness.

DETAILED DESCRIPTION OF THE PREFERRED EMBODIMENTS

Figure 1A:
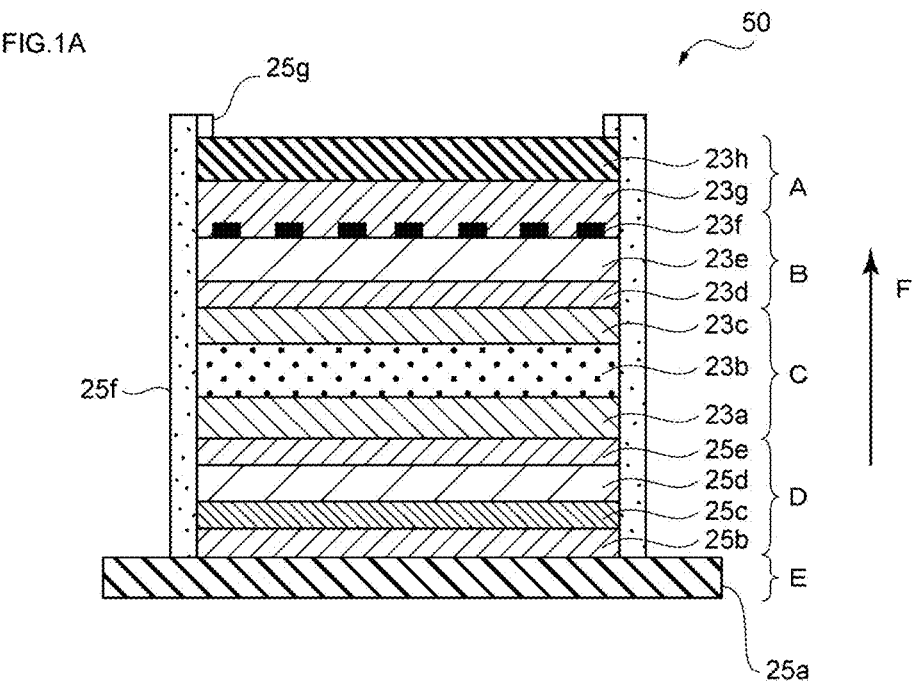
FIGS. 1A and 1B are diagrams to be provided for describing a configuration example of an interior-light-utilizing display of the invention.
Figure 1B:
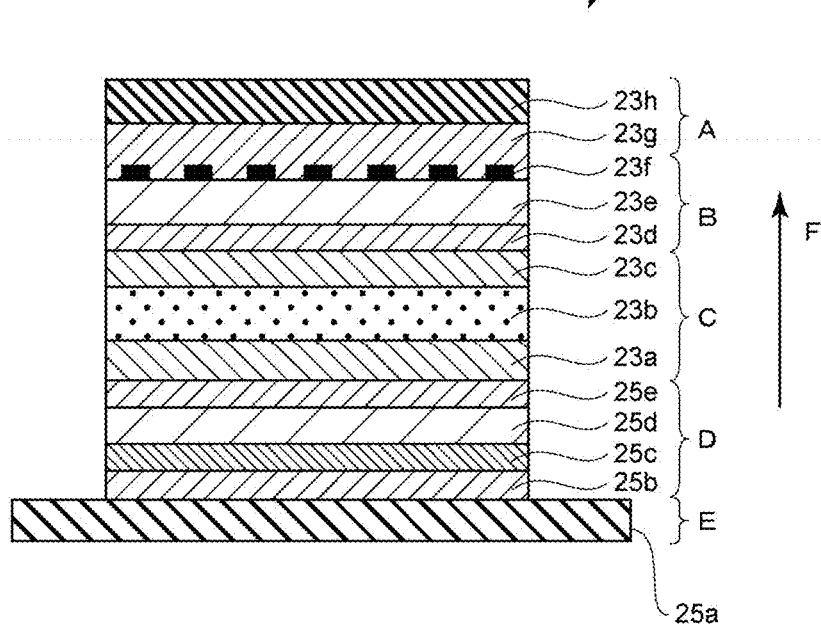
Figure 1C:
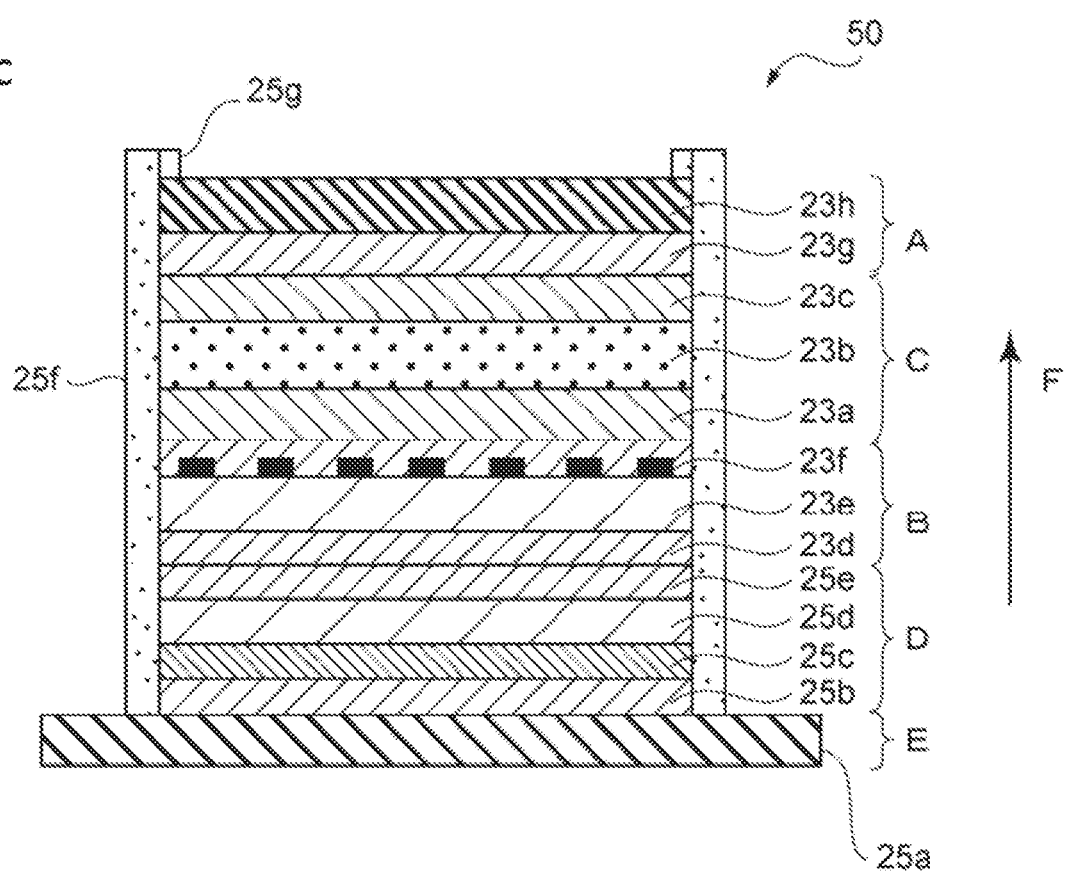
FIG. 1C is a diagram showing a configuration of an interior-light-utilizing display of the invention.

According to an embodiment of the invention, as illustrated in FIG. 1, there is provided an interior-light-utilizing display 50 being obtained by laminating at least a reflection structure D (the reflection structure D including a reflection layer 25c or the like) and a light diffusion film 23b (a light diffusion structure C including the light diffusion film 23b or the like), in which the light diffusion film 23b has an internal structure including a plurality of regions having a relatively high refractive index in a region having a relatively low refractive index in the light diffusion film, and when a normal line direction in the plane of the light diffusion film 23b is regarded as 0°, an angle of aperture of emitted light having a gain in a horizontal direction of 1 or more is set to a value of 35° or more, the angle of aperture of emitted light being measured in a case where a light beam with an incident angle of 0° is irradiated in the horizontal direction from a side opposite to a side facing the reflection structure D of the light diffusion film 23b to the interior-light-utilizing display 50 disposed in a vertical direction.

Further, the interior-light-utilizing display 50 illustrated in FIG. 1 illustratively includes a media structure B including a decorative layer 23f or the like and a protection structure A at an external light incident side of the light diffusion structure C, and further includes a seal material 25f and a surface protection layer 23h as structure separately from those structures.

Hereinafter, an embodiment of the interior-light-utilizing display 50 of the invention will be described in detail with appropriate reference to the drawings.

1. Basic Configuration of Interior-Light-Utilizing Display (1) Basic Configuration First, the basic configuration of the interior-light-utilizing display of the invention will be described in detail.

That is, the interior-light-utilizing display 50 illustrated in FIG. 1A includes an aluminum resin composite plate (ALPOLIC plate) as a substrate 25a, the reflection structure D, the light diffusion structure C, the media structure B, and the protection structure A sequentially from the lower side in a direction along arrow F in the drawing.

That is, FIG. 1A schematically illustrates a cross-section, which is obtained by cutting the interior-light-utilizing display 50 in the horizontal direction, when viewed from the upper side in the vertical direction in plain view.

Figure 2A:
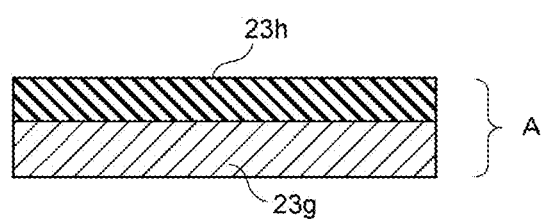
FIGS. 2A to 2D are diagrams to be provided for describing component parts of the interior-light-utilizing display of the invention.
Figure 2B:
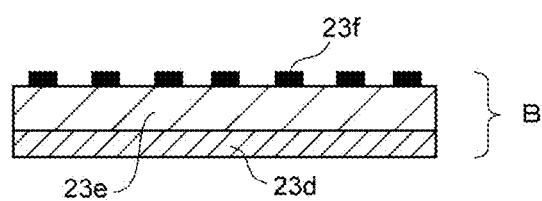
Figure 2C:
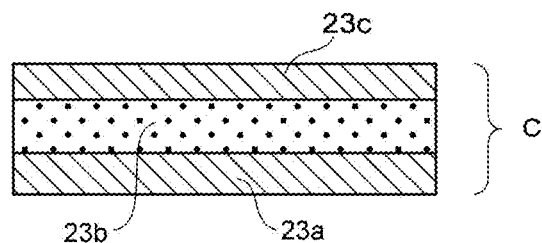
Figure 2D:
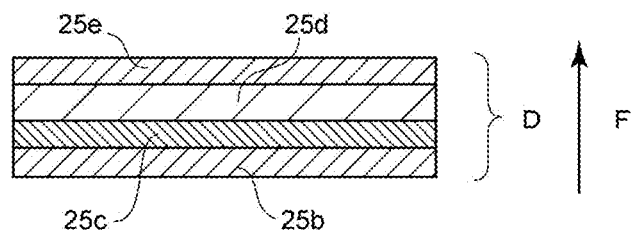

More specifically, as illustrated in FIG. 2D, the interior-light-utilizing display 50 is configured by including a reflection structure D having an adhesive layer 25b, a reflection layer 25c, a substrate 25d, and an adhesive layer 25e sequentially from the lower side in the direction along arrow F in the drawing.

Incidentally, the reflection structure D does not necessarily include both the reflection layer 25c and the substrate 25d and may be configured by a single layer such as a metal foil.

That is, the interior-light-utilizing display including a predetermined reflection structure has a function of reflecting light incident from the outside in a direction in parallel to or with a predetermined angle with respect to the direction along arrow F and emitting the reflected light to a visual recognition side that is an outside direction.

Further, as illustrated in FIG. 2C, the interior-light-utilizing display 50 is configured by including a light diffusion structure C having a transparent resin film 23a (such as a first PET film), a light diffusion film 23b, and a separate transparent resin film 23c (such as a second PET film) (this is simply referred to as a light diffusion film in some cases).

In addition, as illustrated in FIG. 2B, the interior-light-utilizing display 50 includes a media structure B having an adhesive layer 23d, a transparent resin film (such as a first polyvinyl chloride resin film) 23e, and a decorative layer 23f and exhibiting predetermined decorative properties, informativeness, and the like.

Further, as illustrated in FIG. 2A, the interior-light-utilizing display 50 includes a protection structure A including an adhesive layer 23g and a surface protection layer 23h. Furthermore, as a structure separate from the protection structure A, a seal material 25f is provided around the light diffusion film 23b and the like in order to reinforce the mechanical strength or durability of the interior-light-utilizing display.

Further, such an interior-light-utilizing display 50 is, as described later, characterized by having a predetermined internal structure (such as a columnar structure) in the light diffusion film 23b to be used.

Therefore, it is possible to efficiently obtain an interior-light-utilizing display which diffuses and reflects light to the visual recognition side at a wide range of angle of aperture by receiving light from the interior light through a plurality of windows and the like.

That is, a station name signboard or the like as the interior-light-utilizing display existing outside a vehicle such as a train or a bus could be recognized during the night even by a plurality of viewers existing in the vehicle as well as a viewer existing outside the vehicle.

Incidentally, a viewer could sufficiently recognize a station name signboard or the like as the interior-light-utilizing display by utilizing external light such as sunlight even during daylight.

Other than, the aforementioned angle of aperture refers to an angle representing the spreading degree in a state where light emitted from the light diffusion film is diffused and then spread.

Figure 6A:
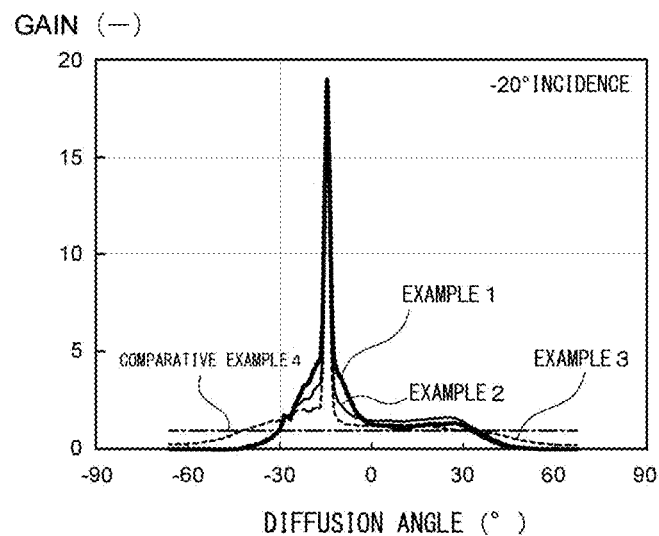
FIGS. 6A and 6B are diagrams to be provided for comparatively describing reflection characteristics of Examples 1 to 4 (interior-light-utilizing displays using a light diffusion control film) and reflection characteristics of Comparative Examples 1 to 4 (interior-light-utilizing displays and standard complete diffusion plates using a retroreflective film) with respect to a gain at an incident angle of −20°.

Therefore, for example, in the case of the characteristic curve corresponding to Example 1 of FIG. 6A, the diffusion angle having a gain of 1 or more is −33° to 33° with respect to an incident light of −20°, so that the angle of aperture becomes 66°.

(2) Reflection Structure D

The reflection structure D is not particularly limited as long as it reflects light, but from the viewpoint that flexibility could be imparted to the interior-light-utilizing display 50, the reflection structure D is preferably a laminate in which the reflection layer 25c is configured by a metal deposited layer and the substrate 25d is configured by the transparent plastic film.

Further, as the metal deposited layer serving as the reflection layer 25c, at least one of an aluminum deposited layer, a silver deposited layer, a stainless steel deposited layer, a copper deposited layer, and the like is exemplified.

Further, as the transparent plastic film serving as the substrate 25d, at least one of a polyester film such as polyethylene terephthalate, a cellulose film such as triacetylcellulose, a polyolefin film such as polyethylene, a polyamide film, a polyimide film, and the like is exemplified.

Further, the three-dimensional shape of the reflection surface of the reflection layer 25c is usually set preferably to a planar shape rich in smoothness, but could also be set to a non-planar shape such as a serrated shape or a corner cube array.

That is, when the three-dimensional shape thereof is a non-planar shape such as a serrated shape or a corner cube array, there is an advantage that the light incident angle and the observing angle could be relatively freely designed.

Further, it is also preferable that the reflection structure is configured as a semi-transmissive reflective type including a configuration partially having a transmissive part.

The reason for this is that under the environment in which light from a plurality of interior lights or the like is relatively sufficient, the light is utilized as a light source of the display light; meanwhile, under the environment in which light from a plurality of interior lights or the like is not sufficient, a backlight provided on the rear surface of the reflection structure could be utilized as a light source of the display light.

Incidentally, the thickness of the reflection structure is set preferably to a value within the range of 1 to 5,000 μm and more preferably to a value within the range of 10 to 200 μm from the viewpoint of achieving both reflectivity and flexibility.

(3) Light Diffusion Structure C

Next, the light diffusion structure C and the light diffusion film 23b that is a main part of the light diffusion structure C, which are illustrated in FIGS. 1 and 2C will be described.

That is, light beams of the interior light coming from a plurality of windows, doors, and the like could be respectively incorporated as incident light beams of constant light diffusion incident angle regions, and could be emitted as diffused and reflected light in a predetermined direction while the light beams are diffused to have a predetermined angle of aperture.

Therefore, since the interior-light-utilizing display 50 uses the light diffusion film 23b having a predetermined internal structure, light of an interior light incident from a wide range of angle through a large number of windows and the like could be efficiently diffused and reflected as diffused and reflected light (display light) at a wide range of angle of aperture at least during the night.

That is, the light diffusion film 23b has an internal structure including a plurality of regions having a relatively high refractive index in a region having a relatively low refractive index in the film, and when a normal line direction in the plane of the light diffusion film 23b is regarded as 0°, an angle of aperture of emitted light having a gain in a horizontal direction of 1 or more is set to a value of 35° or more, the angle of aperture being measured in a case where a light beam with an incident angle of 0° is irradiated in the horizontal direction from a side opposite to a side facing the reflection structure D of the light diffusion film 23b to the interior-light-utilizing display 50 disposed in a vertical direction.

The reason for this is that when such an angle of aperture is a value of below 35°, in a case where the light of the interior light incident at a wide range of angle is received at least during the night, the light of the interior light is difficult to diffuse and reflect efficiently at a wide range of angle of aperture. From the same viewpoint, the aforementioned angle of aperture is set more preferably to a value of 50° or more and further preferably to a value of 60° or more.

Incidentally, the upper limit of the angle of aperture is not particularly limited, but is usually about 90°.

Therefore, the reason for this is that since the light is difficult to emit as diffused and reflected light with a predetermined illuminance at a predetermined angle of aperture from the interior-light-utilizing display, a plurality of viewers and the like existing in a vehicle are difficult to clearly recognize the interior-light-utilizing display as a station name signboard or the like in some cases.

Further, when the normal line direction in the plane of the light diffusion film 23b is regarded as 0°, the angle of aperture of emitted light having a gain in the horizontal direction of 1 or more, which is measured in a case where light beams with incident angles of 20° and −20° are irradiated in the horizontal direction from a side opposite to a side facing the reflection structure D to the interior-light-utilizing display 50 disposed in the vertical direction, is set preferably to a value of 20° or more, more preferably to a value of 40° or more, and particularly preferably to a value of 50° or more.

The reason for this is that, by controlling the angle of aperture of the emitted light in this way, even in a case where the incident angle of the light from the interior light changes with respect to the interior-light-utilizing display, since a train or a bus is usually horizontally long, light with a predetermined angle range is further easily secured.

Therefore, as a matter of practice, since the interior-light-utilizing display has a large light diffusion incident angle region, even in a case where a vehicle moves, a constant amount of light could be received, and further, a plurality of viewers and the like in a vehicle as well as a viewer outside the vehicle could simultaneously and clearly recognize the interior-light-utilizing display as a station name signboard or the like from another window.

Incidentally, the upper limit of the aforementioned angle of aperture is not particularly limited, but is usually about 90°.

Other than, as illuminance of diffused and reflected light (display light) increases, visibility with respect to the interior-light-utilizing display is improved but greatly changes depending on the installation environment. Therefore, by using an index such as a gain, it is found that when the value thereof is 1.0 or more, brighter display that a general signboard could be performed.

Further, it is found that, when a gain of diffused and reflected light along the horizontal direction measured in a case where light beams with incident angles of 20° and −20° are emitted is 1.05 or more, even during the night, the light having such a gain is sufficient as light beams of interior lights coming from a plurality of windows, doors, and the like.

Therefore, in order to further enhance visibility, the gain of diffused and reflected light is preferably a value of 1.10 or more, such a gain is more preferably a value of 1.20 or more, and such a gain is further preferably a value of 1.30 or more.

Figure 3A:
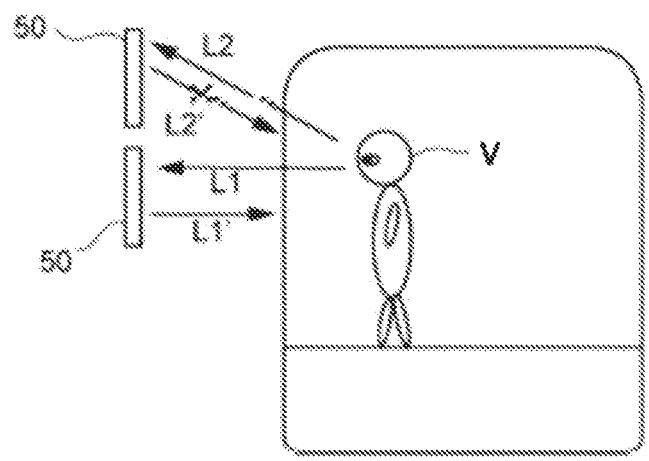
FIGS. 3A and 3B are diagrams to be provided for describing visual recognition states of the interior-light-utilizing display from a vertical direction (FIG. 3A) and a horizontal direction (FIG. 3B) by a viewer (V) wherein L1, L2, L3, and L4, show the direction of light incident to the interior-light-utilizing display and L1', L2', L3', and L4' show the direction of that light when light reflected from the interior-light-utilizing display.
Figure 3B:
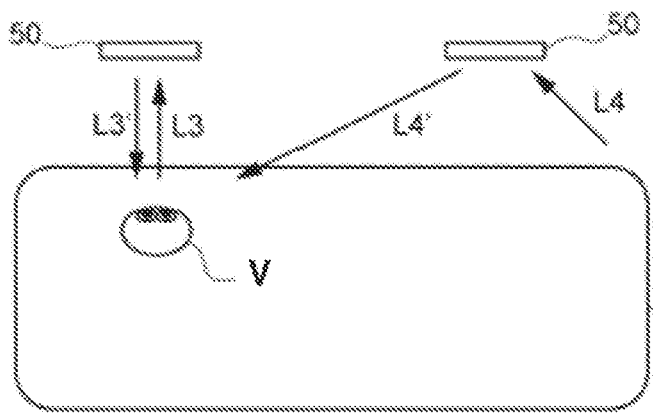

Therefore, as illustrated in FIGS. 3A and 3B, in a relation with a stop position of a vehicle, an existing position, or the like, even in a case where the incident angle of light of the interior light changes with respect to the interior-light-utilizing display, since there is a large number of windows or doors disposed horizontally long, as a matter of practice, constant display characteristics could be stably maintained.

Further, in the interior-light-utilizing display 50, the light diffusion film 23b having a predetermined internal structure does not gauss distribution type light diffusion characteristics in which light diffusion characteristics are simple but has light diffusion characteristics with excellent luminance uniformity, and thus it is also possible to improve luminance uniformity of the display light in a viewing angle.

Figure 4A:
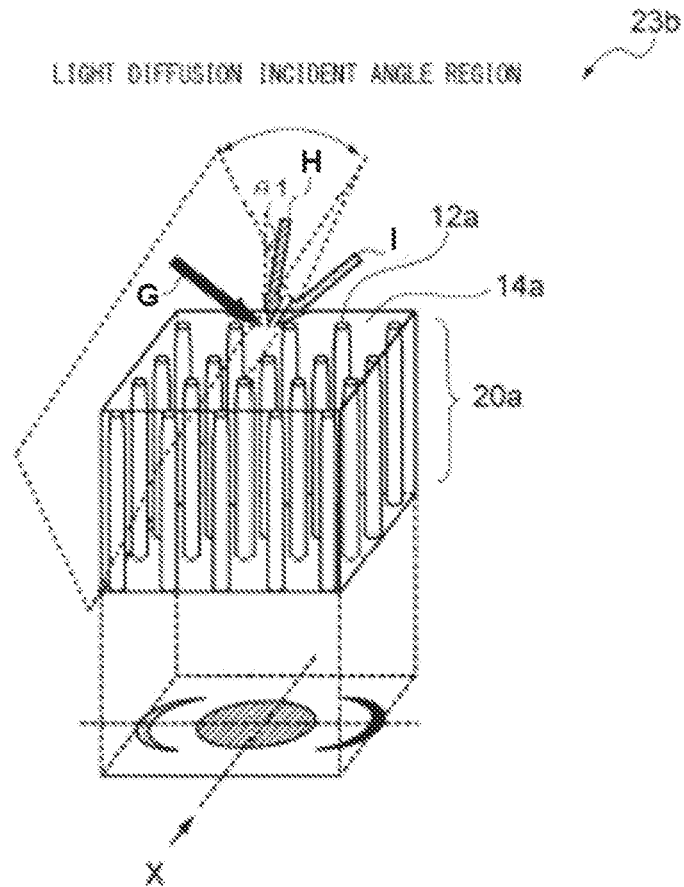
FIGS. 4A and 4B are diagrams to be provided for describing incident angle dependency and isotropic light diffusion in a light diffusion control film having a columnar structure.

Further, a predetermined light diffusion film used in the invention has, as illustrated in FIG. 4A, a columnar structure 20a inside the light diffusion film 23b, and since pillar-shaped objects 12a having a relatively high refractive index are arranged to stand close together in a region 14a having a relatively low refractive index with a predetermined interval, the light diffusion film has a characteristics that incident light in the light diffusion incident angle region is emitted as isotropic diffused light to the outside.

Therefore, a difference in refractive index between such pillar-shaped objects 12a and the region 14a having a relatively low refractive index is set preferably to a value of 0.01 or more, more preferably to a value of 0.05 or more, and further preferably to a value of 0.1 or more.

Further, as incident light H illustrated in FIG. 4A, in a case where the incident angle of incident light is included in the light diffusion incident angle region, the light diffusion film 23b having the columnar structure 20a therein exhibits the light-converging effect even in a case where the incident angle thereof is different, and almost the same diffused light could be emitted.

Figure 4B:
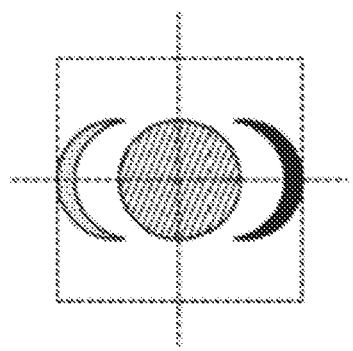

Incidentally, FIG. 4B illustrates a light diffusion state obtained by light being isotropically diffused by the light diffusion film 23b having the columnar structure 20a illustrated in FIG. 4A.

Figure 5A:
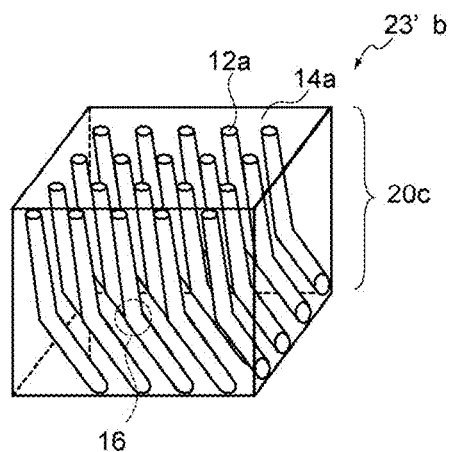
FIGS. 5A and 5B are diagrams to be provided for describing an aspect of an internal structure in a light diffusion control film in the invention.

Further, light diffusion films 23b and 23′b having columnar structures 20a and 20c respectively as illustrated in FIGS. 4A and 5A usually diffuse incident light in a circular pattern and exhibit so-called "isotropic" diffusivity.

However, as the incident light G and incident light I in FIG. 4A, in a case where the incident angle is not included in the light diffusion incident angle region, it is characterized in that as long as the diffusion of the emitted light is diffusion in the plane parallel to the film, the light becomes crescent-shaped light as illustrated in FIG. 4B and the like and this light could also be utilized as diffused light.

That is, also with respect to the incidence of the light source from the outside of the diffusion angle region, the display could be made brightly to some extent with respect to a specular direction by the crescent diffused light.

Furthermore, the light diffusion film having the columnar structure therein also suitably has the following internal structure.

That is, a width (S) of the pillar-shaped object in a cross-section of the pillar-shaped object having a relatively high refractive index in the thickness direction is preferably 0.1 to 15 μm and more preferably 0.5 to 5 μm.

Further, a space (P) between adjacent pillar-shaped objects is preferably 0.1 to 15 μm and more preferably 0.5 to 5 μm. Furthermore, a length (La) of the pillar-shaped object in the normal line direction of the film plane is set preferably to 20 to 700 μm and more preferably to 50 to 300 μm.

Further, in a case where the light diffusion film is incorporated in the interior-light-utilizing display, it is preferable that, on the assumption that the interior-light-utilizing display is disposed in the vertical direction, the light diffusion film is disposed such that a direction in which the angle of aperture of the diffused and emitted light further increases becomes the horizontal direction.

Herein, as illustrated in FIG. 5A, a case where the single-layer light diffusion film 23' includes a columnar structure 20c having a bent part 16 (hereinafter, referred to as a bent columnar type in some cases) and the light diffusion film 23' is incorporated in the interior-light-utilizing display will be described.

That is, in this case, it is preferable that the light diffusion film is disposed such that a direction in which the position of the pillar-shaped object changes (a direction in which the angle of aperture is large) and the horizontal direction of the diffused and emitted light from the display body in a case where the display body is disposed in the vertical direction coincide with each other at one surface side and the other surface side of the light diffusion film.

Figure 5B:
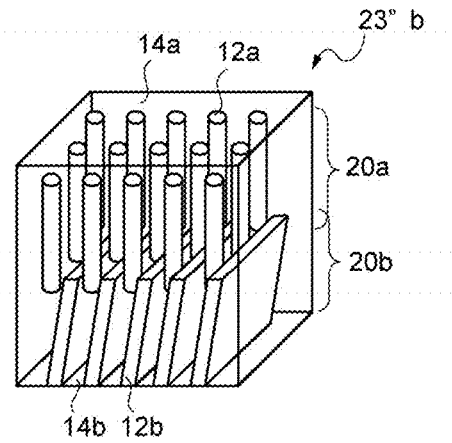

Moreover, a single-layer light diffusion film 23"b illustrated in FIG. 5B includes a columnar structure 20a exhibiting isotropic light diffusion on the upper side of the inside of the film and a louver structure 20b exhibiting anisotropic light diffusion on the lower side of the inside of the film in the drawing.

Further, the columnar structure 20a has the pillar-shaped objects 12a having a relatively high refractive index arranged to stand close together with a predetermined interval in the region 14a having a relatively low refractive index; on the other hand, the louver structure 20b has a plurality of louvers 12b having a relatively high refractive index disposed to stand parallel with a predetermined interval in a region 14b having a relatively low refractive index.

That is, in the light diffusion film 23"b illustrated in FIG. 5B, different light diffusion structures (the columnar structure 20a and the louver structure 20b) are disposed in the vertical direction in a close contact state in which the pillar-shaped objects 12a having a relatively high refractive index and ends of the plurality of louvers 12b having a relatively high refractive index which are included in those structures mutually intrude, respectively in the drawing.

Therefore, light incident to the light diffusion film 23"b is first isotropically diffused by the columnar structure 20a, and this isotropically diffused light is anisotropically diffused by the louver structure 20b to be emitted to the lower side of the outside in the drawing.

Therefore, even in the case of such a light diffusion film 23"b including an internal structure exhibiting different light diffusion characteristics in the single layer, one or a plurality of the light diffusion films are overlapped and used in the light diffusion film of the interior-light-utilizing display, so that desired display light could be visually recognized further clearly.

Further, in the case of using a single-layer light diffusion film instead of a multi-layer light diffusion film, the film thickness of the light diffusion film is preferably a value within the range of 30 to 700 μm and more preferably a value within the range of 60 to 400 μm.

Thus, when the light diffusion film having such a film thickness exhibits predetermined light diffusion characteristics, regardless of the film being a single layer, light coming from a wide range of angle cam be efficiently made to display light and the diffused light could be emitted to a relatively wide range using the front face of the interior-light-utilizing display as a center.

(4) Media Structure B

Further, as illustrated in FIGS. 1A and 1B, it is preferable that the media structure B is disposed at the upper side of the reflection structure D and the light diffusion structure C in the direction along arrow F in the drawing.

Further, it is preferable that the media structure B has a predetermined decorative layer (referred to as a printed layer in some cases) 23f.

Furthermore, it is preferable that the media structure B has the decorative layer 23f on a surface opposite to a surface facing the light diffusion structure C.

With such a configuration, in a case where the incident angle of the interior light changes in relation to a stop position of a vehicle such as a train or an existing position of a viewer, owing to the effect of the light diffusion film having a predetermined internal structure, the viewer or the like in the vehicle could clearly recognize desired display contents by the decorative layer as display light representing station name display or the like.

Further, in the media structure B, as illustrated in FIGS. 1A and 1B, it is preferable from the viewpoint of ease of production that the decorative layer 23f is formed on the transparent resin film 23e.

Further, it is preferable from the viewpoint of easily forming the interior-light-utilizing display, the adhesive layer 23d is provided as a part of the media structure B on one surface.

Further, the decorative layer 23f in such a media structure B may be a printed layer obtained by direct printing disposed at the upper side of the reflection structure D or the light diffusion structure in the direction along arrow F in the drawing.

Incidentally, the lower limit of the thickness of such a decorative layer is usually set preferably to a value of 1 μm or more and more preferably to a value of 5 μm or more.

Meanwhile, the upper limit of the thickness of such a decorative layer is usually set preferably to a value of 50 μm or less and more preferably to a value of 20 μm or less.

Other than, it is also preferable that a colored layer (a black layer or a white layer) is provided on the surface of the decorative layer and a part thereof is cut off to be formed in a shape such as a character, a figure, or a symbol which is desired to be displayed.

With such a configuration, visibility and decorative properties of the decorative layer including a character, a figure, a symbol, or the like which is desired to be displayed could be further improved.

(5) Protection Structure A

Further, as illustrated in FIGS. 1A and 1B, it is also preferable that the protection structure A is provided at the visual recognition side of the media structure B in the direction along arrow F in the drawing.

That is, with such a configuration, durability or the like is excellent, and regarding a part in which the decorative layer blocking light is not formed (a part in which characters, patterns, and the like are not printed), light reflected by the reflection structure D easily transmits through the protection structure A.

On the other hand, regarding a part in which the decorative layer blocking light is formed, transmission of the light reflected by the reflection structure D is inhibited.

Therefore, with the interior-light-utilizing display provided with such a protection structure A, for example, electric power for lightings used for displaying station names of trains or buses is not particularly necessary, and the interior-light-utilizing display could be used over a long period of time at low cost.

Further, since the interior-light-utilizing display 50 illustrated in FIGS. 1A and 1B is usually installed at the outside such as a station platform, it is preferable that the surface protection layer 23h is provided as a part of the protection structure A on the upper side of the light diffusion film 23b in the direction along arrow F in the drawing.

It is preferable that such a surface protection layer 23h is configured by a resin plate or resin film formed from a fluororesin, an acrylic resin, or a polyester resin as a base resin, or a glass plate.

Further, among specific examples of the surface protection layer 23h, from the viewpoint of easily preventing breakage or the like, a resin plate is more preferable.

Further, it is preferable that an ultraviolet absorption function is imparted to the surface protection layer 23h by uniformly blending a predetermined ultraviolet absorber. According to this, a degradation of the light diffusion film due to ultraviolet rays is effectively prevented and the interior-light-utilizing display is withstood against use for a long period of time.

Further, it is also preferable that the ultraviolet absorption layer is provided separately or concurrently at any side of the surface protection layer 23h instead of the ultraviolet absorbing agent being contained in the surface protection layer 23h.

Other than, as for the interior-light-utilizing display 50 in FIGS. 1A and 1B, the ultraviolet absorption function could also be exhibited by blending an ultraviolet absorber with at least one layer of various adhesive layers 25b, 25e, 23d, and 23g, various substrates (transparent resin films) 25d, 23a, 23c, and 23e, and the like.

Further, it is also preferable that a surface of the surface protection layer 23h is subjected to a matte treatment such that the surface roughness (Ra) becomes 50 nm to 100 μm.

The reason for this is that, according to this, decorative properties and high quality feeling could be imparted, and an ultraviolet ray is appropriately reflected diffusely so that the interior-light-utilizing display is withstood for a longer period of time.

Other than, as illustrated in FIG. 1A, it is preferable that the interior-light-utilizing display 50 is provided, for example, with the seal material 25f as a reinforcement member such as an ALPOLIC plate, an acrylic resin plate, a ceramic plate, a glass plate on the bottom surface in the drawing.

The reason for this is that the circumference of the interior-light-utilizing display 50 is mechanically and chemically protected and reinforced by such a seal material 25f so that intrusion of moisture, dust, or the like from the outside could be prevented.

In addition thereto, as illustrated in FIG. 1A, a frame member 25g for uniformly pressing and fixing the circumference of the surface of the light diffusion film is provided in the vicinity of the surface of the seal material 25f, and the mechanical strength of the interior-light-utilizing display 50 is further improved without interrupting the incidence of external light and emission of diffused and reflected light.

(6) Adhesive Layer

Further, as illustrated in FIG. 1 and the like, it is preferable that in the interior-light-utilizing display 50, the reflection layer 25c, the light diffusion film 23b, the decorative layer 23f, and the like are laminated through the adhesive layers 25e, 23d, and 23g and the like, respectively.

An adhesive configuring such an adhesive layer is not particularly limited as long as it has sufficient adhesion and transparency, but for example, a conventionally known acrylic, silicone-based, urethane-based, or rubber-based adhesive could be used.

Further, the lower limit of the thickness of the adhesive layer is usually set preferably to a value of 1 μm or more and more preferably to a value of 3 μm or more.

Meanwhile, the upper limit of the thickness of the adhesive layer is usually set preferably to a value of 100 μm or less and more preferably to a value of 30 μm or less.

(7) Modified Example

As illustrated in FIG. 1B, various modifications could be made as long as the reflection structure D, the light diffusion structure C, the media structure B, and the protection structure A are sequentially provided along arrow F in a case where the interior-light-utilizing display 50 is disposed in the vertical direction and the horizontal cross-section thereof is viewed from the vertical direction.

That is, although not illustrated in the drawing, a configuration may be employed in which a rear surface side protection member, a reflection layer, an adhesive layer, a light diffusion film, an ultraviolet absorption layer, an adhesive force reinforcement resin layer, a resin layer attached with a decorative layer, a front surface resin layer, a front side protection member, and the like are sequentially provided in a case where the interior-light-utilizing display is disposed in the vertical direction and the horizontal cross-section thereof is viewed from the vertical direction.

Further, it is preferable that predetermined buffering spaces are provided between the rear surface side protection member and the reflection layer (reflection structure) and between the front surface resin layer and the front side protection member so that expansion, contraction, and the like of respective constitution layers are absorbed.

That is, the configurations of the interior-light-utilizing display 50 of FIGS. 1A and 1B are merely examples and could be appropriately changed depending on the purpose, use application, and the like.

(8) Production Example

It is preferable that the interior-light-utilizing display 50 illustrated in FIG. 1A and the like is produced, for example, by a method including the following steps 1) to 3):

1) a step of preparing a composition for a light diffusion film including a (meth)acrylic acid ester containing a plurality of aromatic rings as a component (A), urethane (meth)acrylate as a component (B), and a photopolymerization initiator as a component (C);

2) a step of forming a coating layer of the composition for a light diffusion film and irradiating the coating layer with active energy rays to obtain a light diffusion film having an internal structure including a plurality of regions having a relatively high refractive index in a region having a relatively low refractive index in the film; and 3) a step of laminating the light diffusion film and a reflection structure (reflection layer) separately prepared to obtain an interior-light-utilizing display in which light is diffused and reflected in order to adjust an angle of aperture of light having a gain of 1.0 or more to 20° or more by utilizing light emitted from the interior light and being incident at least in an angle range of −20° to +20°, and then a viewer is allowed to recognize the diffused and reflected light.

(Preparing Step of Composition for Light Diffusion Film)

Such a step is a step of mixing, for example, the following components (A) to (C) and other additives as desired in order to prepare a predetermined composition for a light diffusion film.

Further, when mixing, the mixture may be stirred at room temperature without any change, but from the viewpoint of improving uniformity, for example, it is preferable to stir the mixture under heating conditions at 40 to 80° C. to obtain a uniform liquid mixture.

Herein, for example, a (meth)acrylic acid ester containing a plurality of aromatic rings is preferably included as the component (A).

The reason for this is that when the composition includes a particular (meth)acrylic acid ester as the component (A), the polymerization rate of the component (A) could be made faster than the polymerization rate of the component (B), a predetermined difference in the polymerization rate is generated between these components, and thus copolymerizability of the two components is decreased.

Further, as the component (B), for example, the composition preferably includes urethane (meth)acrylate formed from (B1) a compound containing at least two isocyanate groups; (B2) a polyol compound, preferably a diol compound, and particularly preferably polyalkylene glycol; and (B3) hydroxyalkyl (meth)acrylate.

The reason for this is that when urethane (meth)acrylate is used, the difference between the refractive index of the region originating from the component (A) and the refractive index of the region originating from the component (B) could be regulated more easily, fluctuation in the refractive index of the region originating from the component (B) is effectively suppressed, and a light diffusion film having a columnar structure could be obtained more efficiently.

Further, it is preferable to contain a photopolymerization initiator as the component (C).

The reason for this is that when the composition for a light diffusion film is irradiated with active energy rays, the columnar structure in which the plurality of pillar-shaped objects having a relatively high refractive index and originating from the component (A) are arranged to stand close together in the region having a relatively low refractive index and originating from the component (B) could be formed efficiently by the movement of the photopolymerization initiator.

Incidentally, it is preferable that the content (additional amount) of the component (A) is usually set to a value within the range of 25 to 400 parts by weight with respect to 100 parts by weight of the component (B) and the content of the component (C) is set to a value within the range of 0.2 to 20 parts by weight with respect to the total amount (100 parts by weight) of the component (A) and the component (B).

Further, it is preferable to form the columnar structure 20c having a modified pillar-shaped object, which has the bent part 16 in the middle of the pillar-shaped object 12a, as illustrated in FIG. 5A.

In this case, it is preferable that the composition for a light diffusion film includes at least one ultraviolet absorber selected from the group consisting of a hydroxyphenyltriazine-based ultraviolet absorber, a benzotriazole-based ultraviolet absorber, a benzophenone-based ultraviolet absorber, and a hydroxybenzoate-based ultraviolet absorber, with respect to the components (A) to (C), particularly as the component (D).

The reason for this is that, when such an ultraviolet absorber is included as the component (D), an active energy ray having a predetermined wavelength could be selectively absorbed at the time of active energy radiation, and further, the bent part could be effectively formed.

Incidentally, it is preferable that the content (additional amount) of the component (D) is set to a value of below 2 parts by weight (however, excluding 0 part by weight) with respect to the total amount (100 parts by weight) of the component (A) and the component (B).

(Forming Step of Light Diffusion Film)

First, a predetermined composition for a light diffusion film is applied to a process sheet to form a coating layer.

As such a process sheet, a polyethylene terephthalate film or the like is exemplified. It is preferable to apply the composition for a light diffusion film onto the process sheet, for example, by a knife coating method, a roll coating method, a bar coating method, a blade coating method, a die coating method, or a gravure coating method such that the film thickness of the coating layer becomes a value within the range of 60 to 700 μm.

Then, the coating layer is subjected to active energy ray irradiation such as ultraviolet rays or electron beams to form a columnar structure in the film, thereby obtaining a predetermined light diffusion film.

More specifically, in the active energy ray irradiation step, the coating layer formed on the process sheet is irradiated with parallel light having high parallelism of light rays.

Herein, the parallel light means a light in which the direction of emitted light is approximately parallel without any spreading even when viewed from any direction.

More specifically, for example, it is preferable that irradiated light coming from a point light source is converted to parallel light by means of a lens, and then the parallel light is irradiated to the coating layer, or irradiated light coming from a linear light source is converted to parallel light by means of an irradiated light parallelizing member, and then the parallel light is irradiated to the coating layer.

Therefore, the parallelism of the parallel light as irradiated light is set preferably to a value of 10° or less, more preferably to a value of 7° or less, and further preferably to a value of 3° or less.

Further, as described above, when the components (A) to (C) are irradiated with parallel light in a state where a particular ultraviolet absorber is included, the composition for a light diffusion film isotropically diffuses the incident light so that the angle of aperture could be easily increased.

Therefore, the light diffusion film could be configured as a light diffusion film 23'b including the columnar structure 20c having the bent part 16 in the middle of the pillar-shaped object 12a as illustrated in FIG. 5A.

That is, in the interior-light-utilizing display 50 described later, it is preferable that a bending and extending direction of the columnar structure 20c having the bent part 16 of the light diffusion film 23'b is adjusted so that the reflected and diffused light is disposed in parallel to the ground surface (horizontal surface) as illustrated in FIG. 3A.

Other than, a predetermined light diffusion film is not limited to the aforementioned example, and for example, as illustrated in FIG. 5B, the light diffusion film may be a composite-type light diffusion film 23"b having the louver structure 20b and the columnar structure 20a in the film in the vertical direction (film thickness direction).

That is, as described above, the single-layer light diffusion film 23"b illustrated in FIG. 5B includes the columnar structure 20a exhibiting isotropic light diffusion on the upper side inside the film and the louver structure 20b exhibiting anisotropic light diffusion on the lower side inside the film in the drawing.

Therefore, such a composite-type light diffusion film 23"b is produced and could be used in the interior-light-utilizing display 50.

(Assembling Step of Interior-Light-Utilizing Display)

This step is a step for laminating the aforementioned light diffusion film and a reflection structure (reflection layer) separately prepared and adjusting the angle of aperture, which is a width of diffusion angle of light having a gain of 1.0 or more, to 20° or more by utilizing light emitted from the interior light and being incident at least in an angle range of −20° to +20°.

Therefore, this step is a step in which, in order to adjust the angle of aperture of light having a gain of 1.0 or more to 20° or more, light is diffused and reflected and the diffused and reflected light is recognized by a viewer and the like in a vehicle through the interior-light-utilizing display.

More specifically, the interior-light-utilizing display could be produced by pasting the light diffusion film onto a specular reflection member (for example, one in which aluminum is vapor-deposited on the surface of a PET film having a thickness of 100 µm to have a thickness of 300 nm) through an adhesive layer having a thickness of 5 to 15 µm.

EXAMPLES

Hereinafter, the invention will be described in more detail with reference to Examples.

Example 1

1. Production of Light Diffusion Film (1) Synthesis of Low Refractive Index Polymerizable Compound Component (B)

In a container, 2 moles of isophorone diisocyanate (IPDI) as a component (B1) and 2 moles of 2-hydroxyethyl methacrylate (HEMA) as a component (B3) were introduced with respect to 1 mole of polypropylene glycol (PPG) having a weight average molecular weight of 9,200 as a component (B2), and then the components were reacted according to a conventional method to obtain polyether urethane methacrylate having a weight average molecular weight of 9,900.

Incidentally, the weight average molecular weights of polypropylene glycol and polyether urethane methacrylate are values calculated in terms of polystyrene measured by gel permeation chromatography (GPC) under the following conditions.

GPC measuring apparatus: HLC-8020 manufactured by Tosoh Corporation

GPC column: manufactured by Tosoh Corporation (hereinafter, described in order of passage)

TSK guard column HXL-H

TSK gel GMHXL (×2)

TSK gel G2000HXL

Measurement solvent: tetrahydrofuran

Measurement temperature: 40° C.

(2) Preparation of Composition for Light Diffusion Film

Subsequently, a composition for a light diffusion film was obtained by adding 150 parts by weight of o-phenylphenoxy ethoxyethyl acrylate represented by the above Formula (3) and having a molecular weight of 268 as the component (A) and 20 parts by weight of 2-hydroxy-2-methyl-1-phenylpropan-1-one as the component (C) (8 parts by weight with respect to the total amount (100 parts by weight) of the component (A) and the component (B)) to 100 parts by weight of polyether urethane methacrylate having a weight average molecular weight of 9,900 as the obtained component (B), and then heating and mixing the mixture under the condition of 80° C.

Incidentally, the refractive indices of the component (A) and the component (B) were measured according to JIS K0062:1992 using an Abbe refractometer (manufactured by ATAGO CO., LTD., Abbe refractometer DR-M2, Na light source, wavelength: 589 nm), and the refractive indices were 1.58 and 1.46, respectively.

(3) Application Step

Subsequently, the obtained composition for a light diffusion film was applied to a film-like transparent polyethylene terephthalate (hereinafter, referred to as PET) as a process sheet, and a coating layer having a film thickness of 120 µm was formed.

(4) Active Energy Ray Irradiation Step

Subsequently, while the coating layer was moved in a predetermined direction, the coating layer was irradiated with parallel light having a parallelism of 2° or less (ultraviolet ray emitted from a high pressure mercury lamp, having a primary peak wavelength at 365 nm, and other peaks at 254 nm, 303 nm, and 313 nm) such that the angle of irradiation (θd) would be almost 10°, using an ultraviolet spot parallel light source (manufactured by Japan Technology System Corp.) having a central ray parallelism controlled to ±3° or less.

The peak illuminance at that time was set to 1.08 mW/cm2, the cumulative amount of light was set to 53.13 mJ/cm$^2$, the lamp height was set to 240 mm, and the travel speed of the coating layer was set to 0.2 m/min.

Subsequently, an ultraviolet-transmissive peeling film having a thickness of 38 µm (manufactured by LINTEC Corporation, SP-PET382050) was laminated to the exposed surface side of the coating layer.

Subsequently, the coating layer was completely cured by irradiating the coating layer, from above the peeling film, with a scattered light produced by making the direction of propagation of the aforementioned parallel light random under the conditions of a peak illuminance of 10 mW/cm² and a cumulative amount of light of 150 mJ/cm², and thus a light diffusion film with a single columnar structure (referred to as TYP1 in Table 1) in which the film thickness excluding the process sheet and the peeling film was 170 μm, was obtained.

2. Production of Interior-light-utilizing display (Specimen)

Subsequently, as illustrated in FIGS. 2A and 2B, the obtained light diffusion film was pasted onto a specular reflection member (one in which aluminum is vapor-deposited on the surface of a PET film having a thickness of 100 μm to have a thickness of 300 nm) as the reflection structure through an adhesive layer having a thickness of 15 μm, thereby producing a specimen for interior-light-utilizing display evaluation.

Incidentally, because of the light diffusion characteristics, in the aforementioned active energy ray irradiation step, in a case where a direction in which the light diffusion film is produced in the longitudinal direction was regarded as an MD direction, the light diffusion film is disposed such that a TD direction horizontally perpendicular to the MD direction became a vertical direction.

That is, in a case where the interior-light-utilizing display was disposed in the vertical direction, the light diffusion film was pasted to the specular reflection member such that a direction in which the position of the pillar-shaped object is different at one surface side and the other surface side of the light diffusion film was parallel to the horizontal direction.

3. Evaluation of Interior-light-utilizing display (1) Evaluation 1 of Diffuse Reflection Characteristics (Gain)

Light beams in the horizontal direction that were assumed to be light from the interior light were made incident from a side opposite to a side facing the reflection structure of the light diffusion film such that the incident angle became predetermined angles (−20°, 0°, and +20°), while the normal line direction in the plane of the light diffusion film was regarded as 0°, in a state where the interior-light-utilizing display including the obtained light diffusion film and the like was disposed.

Then, the direction and the degree of brightness of the diffused and reflected light beams were measured using a compact simplified scattering measurement instrument (manufactured by Cybernet Systems Co., Ltd., Mini-Diff), and a gain was calculated in relation to a reference value.

Figure 6B:
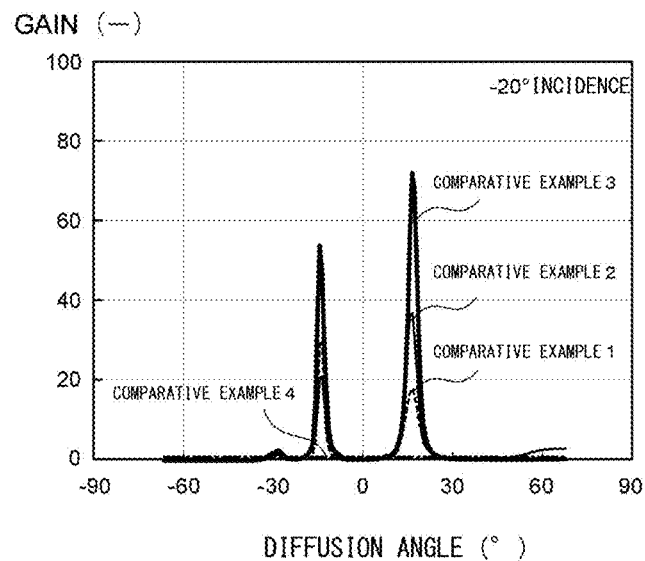

Further, FIGS. 6B and 6B show charts as characteristic curves in which a diffusion angle (°) at −20° incidence is plotted on the horizontal axis and a gain corresponding to the diffusion angle (°) is plotted on the vertical axis.

Figure 7A:
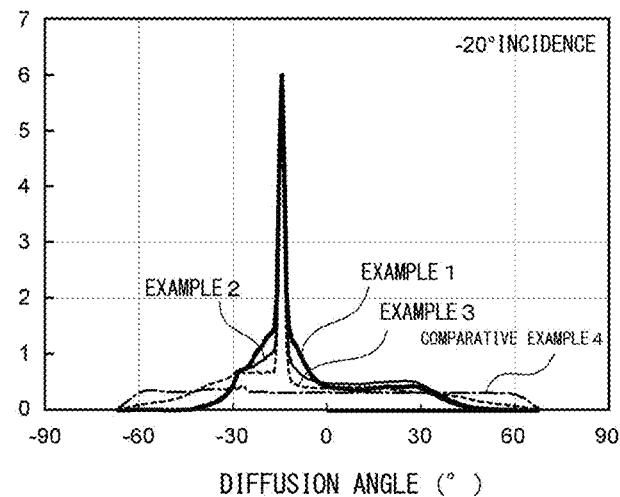
FIGS. 7A and 7B are diagrams to be provided for comparatively describing reflection characteristics of Examples 1 to 4 (interior-light-utilizing displays using a light diffusion control film) and reflection characteristics of Comparative Examples 1 to 4 (interior-light-utilizing displays and standard complete diffusion plates using a retroreflective film) with respect to luminance at an incident angle of −20°.
Figure 7B:
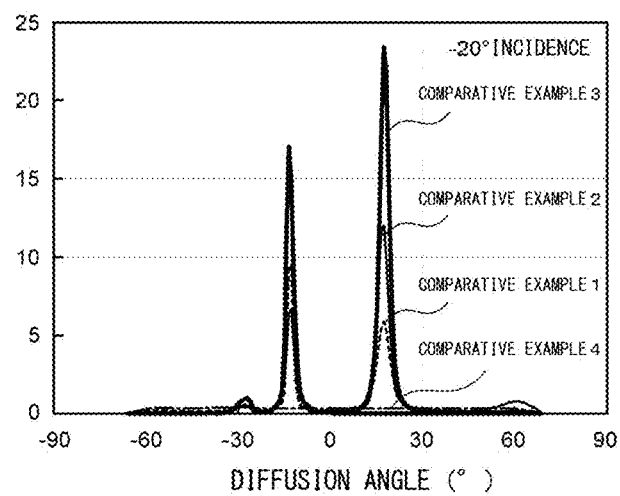

Further, FIGS. 7A and 7B show charts as characteristic curves in which a diffusion angle (°) at −20° incidence is plotted on the horizontal axis and a luminance value corresponding to the diffusion angle (°) is plotted on the vertical axis.

Figure 8A:
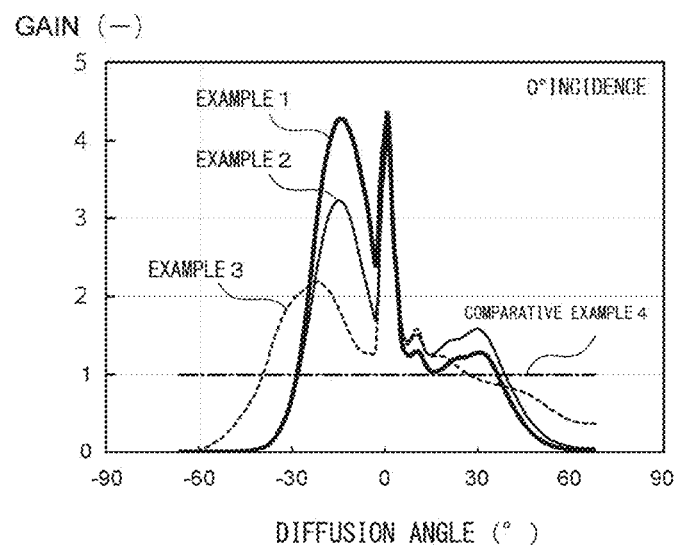
FIGS. 8A and 8B are diagrams to be provided for comparatively describing reflection characteristics of Examples 1 to 4 (interior-light-utilizing displays using a light diffusion control film) and reflection characteristics of Comparative Examples 1 to 4 (interior-light-utilizing displays and standard complete diffusion plates using a retroreflective film) with respect to a gain at an incident angle of 0°.
Figure 8B:
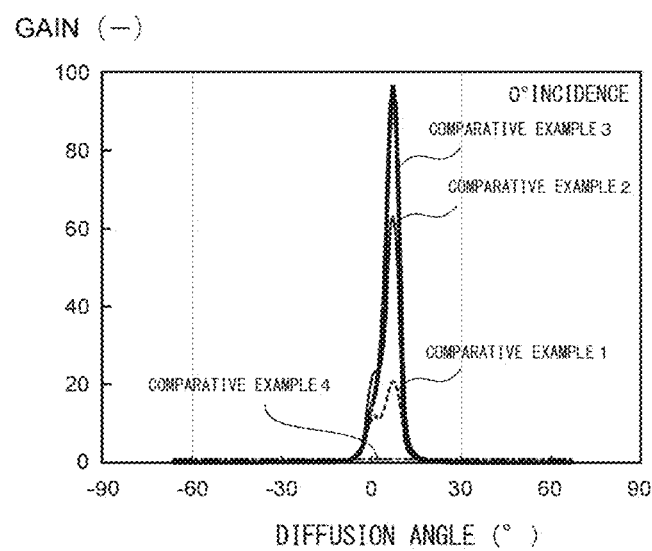

Further, FIGS. 8A and 8B show charts as characteristic curves in which a diffusion angle (°) at 0° incidence is plotted on the horizontal axis and a gain corresponding to the diffusion angle (°) is plotted on the vertical axis.

Figure 9A:
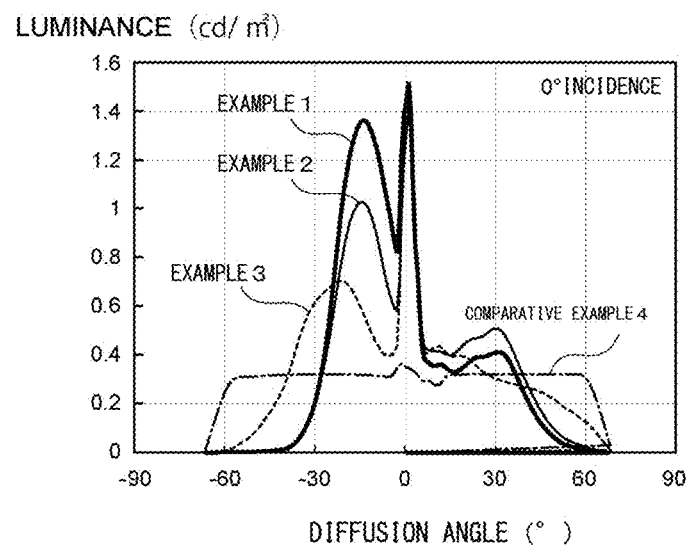
FIGS. 9A and 9B are diagrams to be provided for comparatively describing reflection characteristics of Examples 1 to 4 (interior-light-utilizing displays using a light diffusion control film) and reflection characteristics of Comparative Examples 1 to 4 (interior-light-utilizing displays and standard complete diffusion plates using a retroreflective film) with respect to luminance at an incident angle of 0°.
Figure 9B:
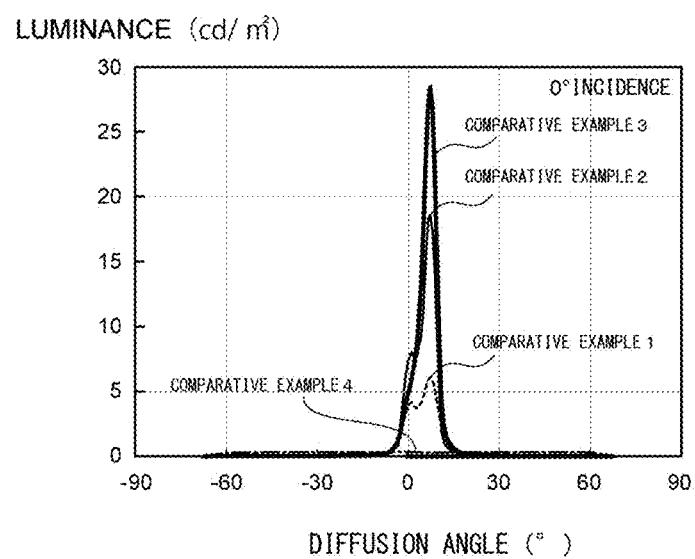

Further, FIGS. 9A and 9B show charts as characteristic curves in which a diffusion angle (°) at 0° incidence is plotted on the horizontal axis and a luminance value corresponding to the diffusion angle (°) is plotted on the vertical axis.

Figure 10A:
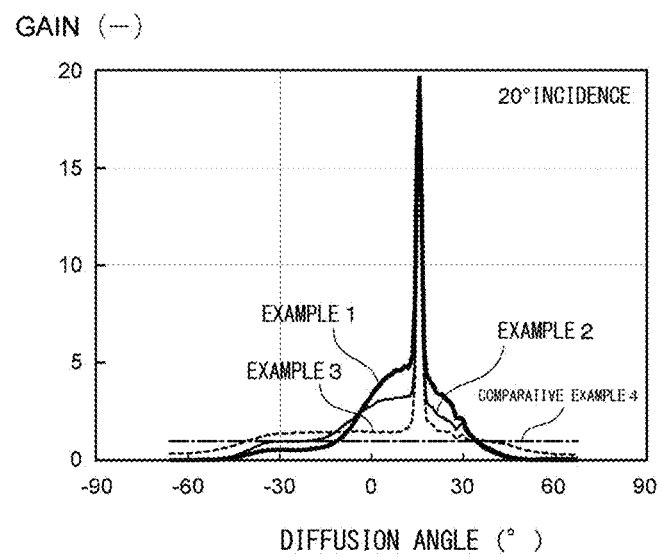
FIGS. 10A and 10B are diagrams to be provided for comparatively describing reflection characteristics of Examples 1 to 4 (interior-light-utilizing displays using a light diffusion control film) and reflection characteristics of Comparative Examples 1 to 4 (interior-light-utilizing displays and standard complete diffusion plates using a retroreflective film) with respect to a gain at an incident angle of 20°.
Figure 10B:
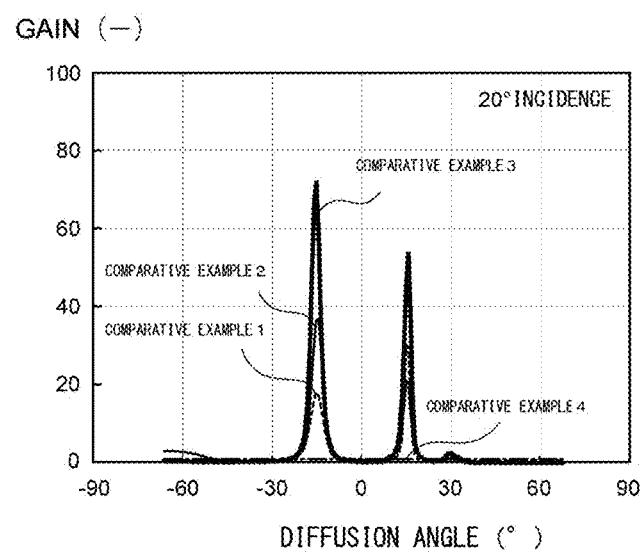

Further, FIGS. 10A and 10B show charts as characteristic curves in which a diffusion angle (°) at 20° incidence is plotted on the horizontal axis and a gain corresponding to the diffusion angle (°) is plotted on the vertical axis.

Figure 11A:
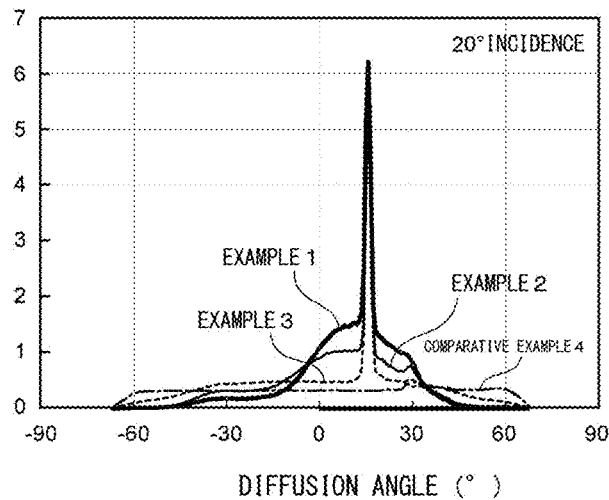
FIGS. 11A and 11B are diagrams to be provided for comparatively describing reflection characteristics of Examples 1 to 4 (interior-light-utilizing displays using a light diffusion control film) and reflection characteristics of Comparative Examples 1 to 4 (interior-light-utilizing displays and standard complete diffusion plates using a retroreflective film) with respect to luminance at an incident angle of 20°.
Figure 11B:
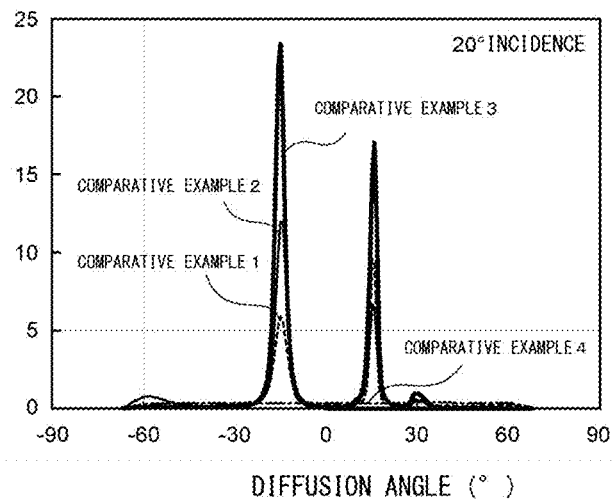

Further, FIGS. 11A and 11B show charts as characteristic curves in which a diffusion angle (°) at 20° incidence is plotted on the horizontal axis and a luminance value corresponding to the diffusion angle (°) is plotted on the vertical axis.

Figure 12A:
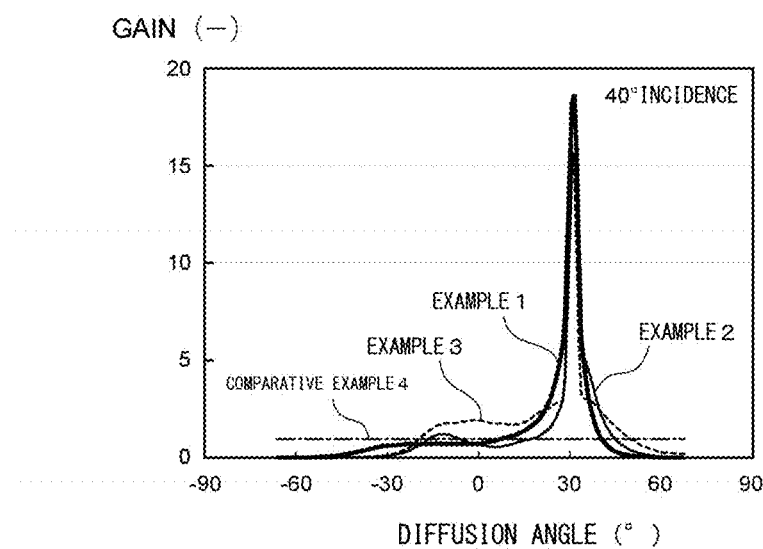
FIGS. 12A and 12B are diagrams to be provided for comparatively describing reflection characteristics of Examples 1 to 4 (interior-light-utilizing displays using a light diffusion control film) and reflection characteristics of Comparative Examples 1 to 4 (interior-light-utilizing displays and standard complete diffusion plates using a retroreflective film) with respect to a gain at an incident angle of 40°.
Figure 12B:
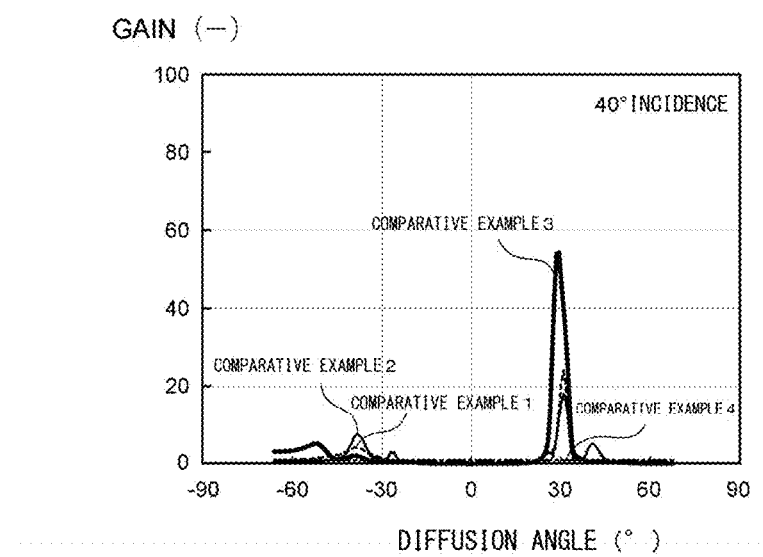

Further, FIGS. 12A and 12B show charts as characteristic curves in which a diffusion angle (°) at 40° incidence is plotted on the horizontal axis and a gain corresponding to the diffusion angle (°) is plotted on the vertical axis.

Figure 13A:
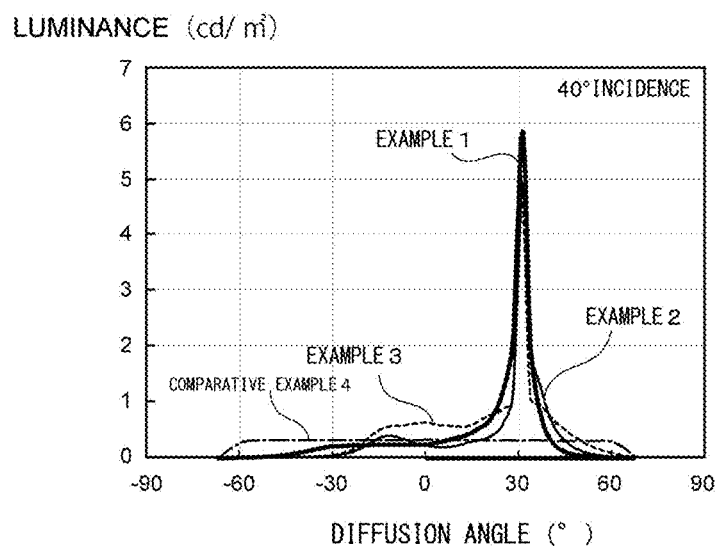
FIGS. 13A and 13B are diagrams to be provided for comparatively describing reflection characteristics of Examples 1 to 4 (interior-light-utilizing displays using a light diffusion control film) and reflection characteristics of Comparative Examples 1 to 4 (interior-light-utilizing displays and standard complete diffusion plates using a retroreflective film) with respect to luminance at an incident angle of 40°.
Figure 13B:
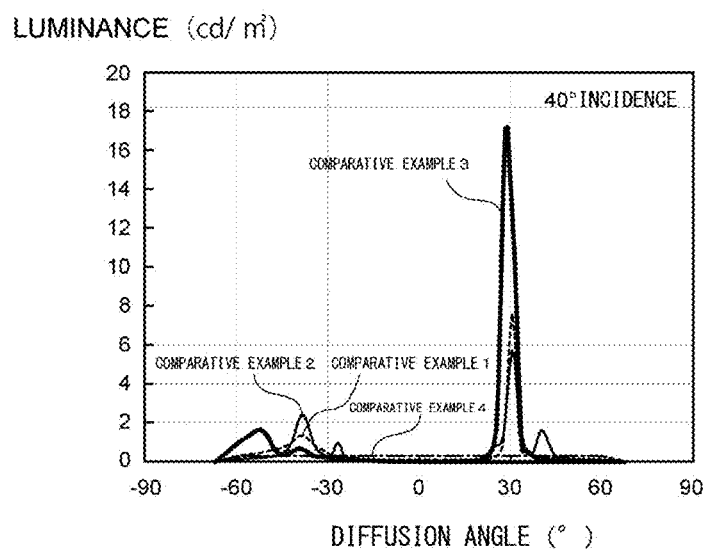

Further, FIGS. 13A and 13B show charts as characteristic curves in which a diffusion angle (°) at 40° incidence is plotted on the horizontal axis and a luminance value corresponding to the diffusion angle (°) is plotted on the vertical axis.

Incidentally, a range of a light diffusion angle of diffused light having a gain of 1.0 or more (a width thereof being corresponding to the angle of aperture) is presented in Table 1 on the basis of Comparative Example 4.

(2) Evaluation 2 of Diffuse Reflection Characteristics (Front Face and Inclination)

Figure 14A:
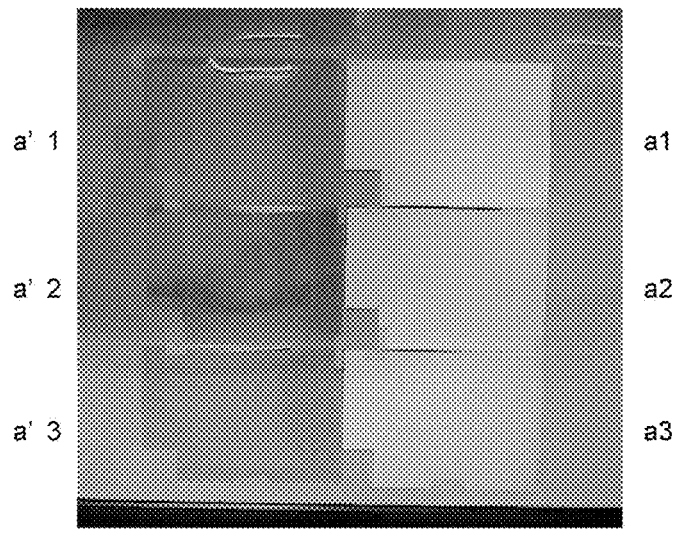
FIGS. 14A and 14B are diagrams to be provided for comparatively describing visual properties in a case where an interior-light-utilizing display using a light diffusion film is observed from a front face and inclination 30°.

In a state where obtained interior-light-utilizing display was pasted to a wall illuminated by an interior lamp and was disposed in the vertical direction, a state seen from the front face of the interior-light-utilizing display was observed with a photograph (corresponding to symbol a1 in FIG. 14A) and evaluation was performed according to the following criteria.

Figure 14B:
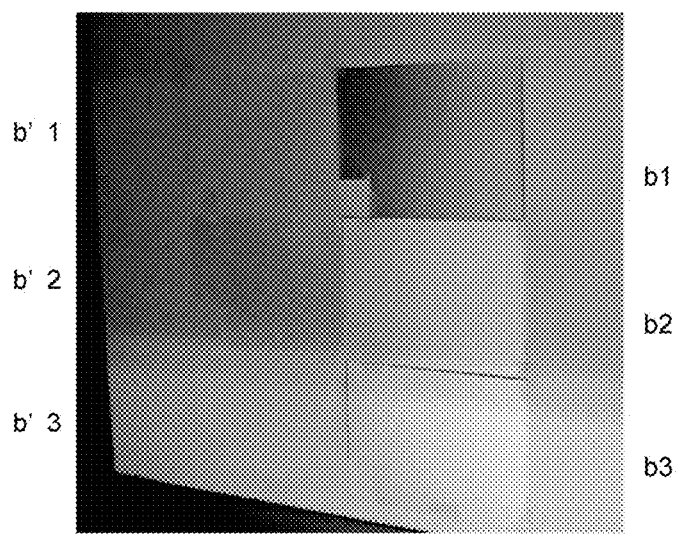
Figure 15A:
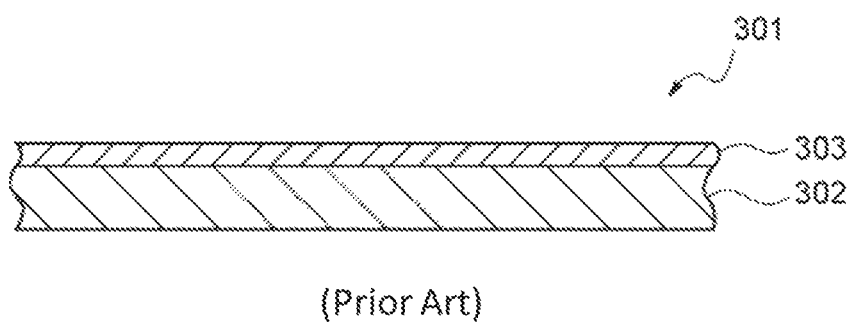
FIGS. 15A and 15B are diagrams to be provided for describing a conventional external-light-utilizing type reflection film or the like, respectively.
Figure 15B:
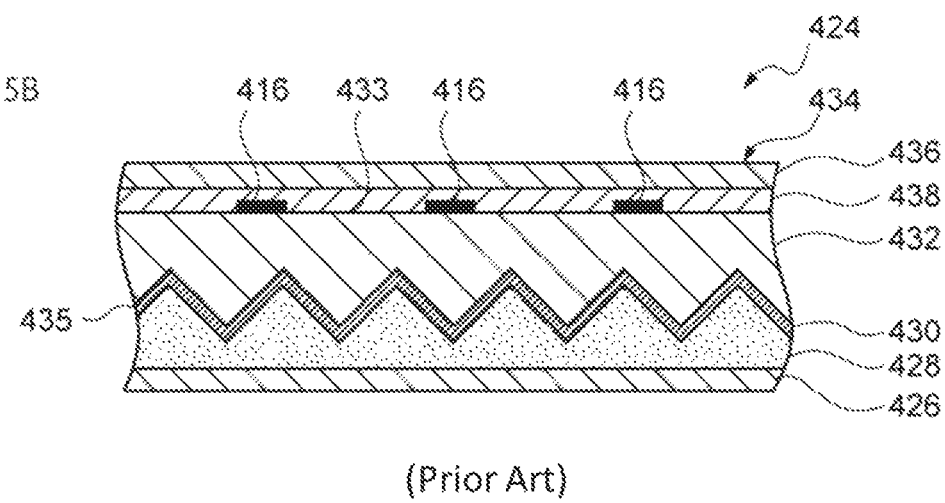

Similarly, a state when the interior-light-utilizing display was seen from inclination 30° was observed with a photograph (corresponding to b1 in FIG. 14B) and evaluation was performed according to the following criteria.

⊚ (Very Good): The interior-light-utilizing display is seen while turning whitish.

○ (Good): The interior-light-utilizing display is seen while turning slightly whitish.

Δ (Fair): The interior-light-utilizing display is seen while turning slightly blackish.

x (Bad): The interior-light-utilizing display is seen while turning blackish.

Example 2

In Example 2, a light diffusion film (referred to as TYP2 in Table 1) was produced in the same manner as in Example 1, except that the light diffusion film was produced as follows.

That is, the light diffusion film (having a bent part, a bent columnar structure with a length of 120 μm and an inclination of 5°) was produced in the same manner as in Example 1, except that when the composition for a light diffusion film was prepared, the ultraviolet absorber (manufactured by BASF, TINUVIN 384-2) as the component (D) was further added at a ratio of 0.08 part by weight.

Subsequently, the evaluation was performed in the same manner as in Example 1, using the obtained light diffusion film.

Example 3

In Example 3, the composition for a light diffusion film having a length of 200 μm of Example 2 was irradiated with parallel light under the condition of Example 1, the peeling film was then laminated, the second irradiation (incident angle: 0°, peak illuminance: 2.54 mW/cm², cumulative amount of light: 46.76 mJ/cm²) was performed from above the peeling film, and thus a light diffusion film (referred to as TYP3 in Table 1) having a bent double columnar structure in which the lower columnar structure is bent in the middle thereof was produced according to Example 1.

Subsequently, the evaluation was performed in the same manner as in Example 1, using the obtained light diffusion film.

Example 4

In Example 4, a light diffusion film (referred to as TYP4 in Table 1) was produced in the same manner as in Example 1, except that the light diffusion film was produced as follows.

That is, the light diffusion film was produced, except that when the composition for a light diffusion film was prepared, the applied thickness was set to 60 μm and the angle of irradiation (θd) was set to 0°. The peak illuminance at that time was 1.14 mW/cm² and the cumulative amount of light was 57.6 mJ/cm².

Subsequently, the evaluation was performed in the same manner as in Example 1, using the obtained light diffusion film.

Comparative Example 1

In Comparative Example 1, the evaluation was performed in the same manner as in Example 1, except that a retroreflective sheet (encapsulated type) FMG PSH8512 (manufactured by NIPPON CARBIDE INDUSTRIES CO., INC., referred to as TYP5 in Table 1) was used instead of the light diffusion film of Example 1.

Comparative Example 2

In Comparative Example 2, the evaluation was performed in the same manner as in Example 1, except that a retroreflective sheet (high-brightness encapsulated lens type) ULP OR812 (manufactured by NIPPON CARBIDE INDUSTRIES CO., INC., referred to as TYP6 in Table 1) was used instead of the light diffusion film of Example 1.

Comparative Example 3

In Comparative Example 3, the evaluation was performed in the same manner as in Example 1, except that a retroreflective sheet (ultrabright prism lens type) CRG CF99802 (manufactured by NIPPON CARBIDE INDUSTRIES CO., INC., referred to as TYP7 in Table 1) was used instead of the light diffusion film of Example 1.

Comparative Example 4

In Comparative Example 4, the evaluation was performed in the same manner as in Example 1, except that a standard complete diffusion plate (manufactured by Edmund Optics, referred to as TYP8 in Table 1) was used instead of the light diffusion film of Example 1.

TABLE 1

| | Light diffusion film | Retroreflective sheet or the like | Standard diffusion plate | Evaluation 1 | | | Evaluation 2 | |
|---|---|---|---|---|---|---|---|---|
| | | | | −20° incidence | 0° incidence | 20° incidence | Front face | Inclination |
| Example 1 | TYP1 | | | −30 to +33 | −28 to +36 | −11 to +34 | ☉ | Δ |
| Example 2 | TYP2 | | | −30 to +35 | −28 to +39 | −21 to +35 | ☉ | ☉ |
| Example 3 | TYP3 | | | −42 to +30 | −39 to +26 | −41 to +38 | ☉ | ☉ |
| Example 4 | TYP4 | | | −25 to +29 | −19 to +27 | −26 to +26 | ☉ | X |
| Comparative Example 1 | | TYP5 | | −30 to −27 | −8 to +19 | +11 to +21 | X | X |
| Comparative Example 2 | | TYP6 | | −30 to −27 | −6 to +15 | +11 to +21 | X | X |
| Comparative Example 3 | | TYP7 | | −32 to −26 | −6 to +17 | +9 to +21 | X | Δ |
| Comparative Example 4 | | | TYP8 | — | — | — | — | — |

Evaluation 1: diffuse reflection characteristics
Evaluation 2: diffuse reflection characteristics (front face and inclination)

INDUSTRIAL APPLICABILITY

Hereinbefore, as specifically described, according to the interior-light-utilizing display of the invention, in the interior-light-utilizing display obtained by laminating a reflection structure including a reflection layer and a predetermined light diffusion film, constant display characteristics could be stably maintained even during the night by utilizing an interior light of a train or a bus and the luminance of the display light in a viewing angle is increased.

Therefore, according to the interior-light-utilizing display of the invention, even in a case where there is no electric lamp system, the interior-light-utilizing display is expected to be applied to various display bodies such as station name signboards, signboards, and signs for advertisement and road which could be recognized during the night.

More specifically, in other words, effects as described below could be achieved by the interior-light-utilizing display of the invention and preferred embodiments thereof. That is, it could be said that the interior-light-utilizing display of the invention has a wide range of industrial applicability.

1) A plurality of viewers and the like existing in vehicles such as trains and buses could clearly recognize the interior-light-utilizing display as diffused light representing a station name signboard regardless of day and night without a particular power source.

2) A large number of viewers could simultaneously recognize the interior-light-utilizing display as diffused light representing a station name signboard from another window, for example, using light from a window of a train or the like as a light source.

3) By the light-converging effect, light beams of interior lights emitted from a plurality of windows of vehicles are incorporated, and the reflection luminance of the interior-light-utilizing display as diffused light representing a station name signboard could be increased.

4) Since the interior-light-utilizing display has a large angle of aperture, a large number of viewer could recognize, at once, the interior-light-utilizing display as diffused light representing a station name signboard from a plurality of windows of trains or the like in a clear state.

5) Even in the case of moving trains or the like, since incident light in a predetermined angle and incident light out of the predetermined angle are comparable, the brightness of the display body is maintained at a constant level.

6) Even in the case of moving trains or the like, since the angle of aperture of diffused light is large, the interior-light-utilizing display could be recognized as diffused light representing a station name signboard at a certain distance (a certain time period) and the same level of sharpness.

REFERENCE NUMERALS

12$a$ PILLAR-SHAPED OBJECT HAVING RELATIVELY HIGH REFRACTIVE INDEX
12$b$ LOUVER HAVING RELATIVELY HIGH REFRACTIVE INDEX
14$a$ REGION HAVING RELATIVELY LOW REFRACTIVE INDEX
14$b$ LOUVER HAVING RELATIVELY LOW REFRACTIVE INDEX
16 BENT PART
20$a$, 20$c$ COLUMNAR STRUCTURE
20$b$ LOUVER STRUCTURE
23, 23$a$, 23$c$, 23$e$ TRANSPARENT RESIN FILM
23$b$, 23'$b$, 23"$b$ LIGHT DIFFUSION FILM
23$d$, 23$g$, 25$e$, 25$b$ ADHESIVE LAYER
25$c$ REFLECTION LAYER
23$h$ SURFACE PROTECTION LAYER (ULTRAVIOLET ABSORPTION LAYER)
23$f$ DECORATIVE LAYER
25$a$ SUBSTRATE
25$f$ SEAL MATERIAL
25$g$ PRESSING MEMBER (FRAME MEMBER)
50 INTERIOR-LIGHT-UTILIZING DISPLAY

What is claimed is:

1. An interior-light-utilizing display being obtained by laminating a reflection structure and a light diffusion structure comprising a light diffusion film,
wherein an interior-light provided in a vehicle is used as a light source,
wherein the light diffusion film has an internal structure including a plurality of regions having a relatively high refractive index in a region having a relatively low refractive index in the film, and
if a normal line direction in a plane of the light diffusion film is regarded as 0°, an angle of aperture of emitted light having a gain in a horizontal direction of 1 or more is set to a value of 35° or more with respect to a standard white plate, the angle of aperture of emitted light being measured where a light beam with an incident angle of 0° is irradiated in the horizontal direction from a side opposite to a side facing the reflection structure of the light diffusion film to the interior-light-utilizing display disposed in a vertical direction.

2. The interior-light-utilizing display according to claim 1, wherein the angle of aperture of emitted light having a gain in the horizontal direction of 1 or more is set to a value of 20° or more, the angle of aperture of emitted light being measured where light beams with incident angles of 20° and −20° are irradiated in the horizontal direction from the side opposite to the side facing the reflection structure of the light diffusion film to the interior-light-utilizing display disposed in the vertical direction.

3. The interior-light-utilizing display according to claim 1, wherein the internal structure in the light diffusion film is a columnar structure in which a plurality of pillar-shaped objects having a relatively high refractive index are arranged to stand close together in a film thickness direction in a region having a relatively low refractive index.

4. The interior-light-utilizing display according to claim 1, wherein the columnar structure is a multiple columnar structure obtained by laminating at least a first columnar structure and a second columnar structure in the film thickness direction.

5. The interior-light-utilizing display according to claim 1, wherein the columnar structure has a bent part in the middle of the pillar-shaped object.

6. The interior-light-utilizing display according to claim 1, wherein a decorative layer is provided between the reflection structure and the light diffusion film or a side opposite to a side at which the reflection structure is positioned in the light diffusion film.

7. The interior-light-utilizing display according to claim 1, wherein an ultraviolet absorption layer is provided at a front surface of the light diffusion film.

8. The interior-light-utilizing display according to claim 1, wherein the vehicle is a train or a bus.

9. The interior-light-utilizing display according to claim 1, wherein an angle of aperture of the emitted light is set to a value of 50° or more.

10. The interior-light-utilizing display according to claim 1, wherein an angle of aperture of the emitted light is set to a value of 60° or more.

11. The interior-light-utilizing display according to claim 1, further comprising an aluminum resin composite plate substrate.

12. The interior-light-utilizing display according to claim 1, further comprising a media structure and a protective.

* * * * *